United States Patent
Mazda

[19]

[11] Patent Number: 6,140,784
[45] Date of Patent: Oct. 31, 2000

[54] POWER OFF VELOCITY CONTROL FOR DISK DRIVES

[75] Inventor: Babak Mazda, Mountain View, Calif.

[73] Assignee: Quantum Corporation, Milpitas, Calif.

[21] Appl. No.: 09/328,753

[22] Filed: Jun. 9, 1999

[51] Int. Cl.⁷ .................................................. H02P 1/00
[52] U.S. Cl. .......................... 318/280; 318/368; 318/632; 318/364; 360/78.04; 360/75
[58] Field of Search ................................. 318/280, 368, 318/632, 364; 360/78.04, 75

[56] References Cited

U.S. PATENT DOCUMENTS

| | | | |
|---|---|---|---|
| 5,473,230 | 12/1995 | Dunn et al. | 318/632 |
| 5,495,156 | 2/1996 | Wilson et al. | 318/368 |
| 5,668,679 | 9/1997 | Swearingen et al. | 318/280 |
| 5,737,144 | 4/1998 | Ataee | 360/75 |
| 5,739,994 | 4/1998 | Ottesen et al. | 318/280 |
| 5,872,670 | 2/1999 | Ataee | 360/69 |
| 5,969,899 | 10/1999 | Swearingen et al. | 318/289 |

*Primary Examiner*—Karen Masih
*Attorney, Agent, or Firm*—Michael Zarrabian

[57] ABSTRACT

A method and circuit for controlling a voice coil motor (VCM) for a disk drive actuator assembly such that the actuator assembly moves to a landing area at a constant velocity when the disk drive loses power. The circuit includes a sense amplifier for sensing and amplifying current to the VCM, a current integrator for determining the actual velocity of the actuator assembly during every seek, an H-bridge driver, which controls the direction of current to the VCM and magnitude of voltage across the VCM and a window compare and logic block that receives and sorts information from the integrator, and a timer. The window compare and logic block determines the direction of current and magnitude of voltage to apply to the VCM. During a loss of power, e.g. a power down or sudden loss of power, the actuator assembly is controlled through a sequence of movements, depending on the position and actual velocity of the actuator assembly/transducer head at the moment power was lost, to ensure that the transducer head is retracted to the landing area at a constant velocity.

27 Claims, 2 Drawing Sheets

POWER OFF VELOCITY CONTROL FOR DISK DRIVES

FIELD OF THE INVENTION

The present invention relates generally to disk drives for storing data. More specifically, the present invention relates to a circuit for controlling the velocity of a disk drive actuator assembly during a power loss.

BACKGROUND

A conventional disk drive includes at least one rotating data storage disk and an actuator assembly for positioning a transducer head over each data storage surface of the disk or disks. The disk or disks are rotated by a spindle motor while the actuator assembly is actuated by a voice coil motor (VCM). When the disk drive loses power, for whatever reason, it is desirable to move the transducer heads to a safe landing area for parking on the disk surface or away from the disk surfaces altogether. It is well known that when a disk drive loses power, the spindle motor may act as a generator as kinetic energy from the rotational mass of the rotating disks and associated spindle may be converted into electrical energy. It is also well known that this converted electrical energy, known as back EMF (BEMF) is utilized to drive the VCM so that the transducer heads may be parked at the landing area, once power is lost. It is also desirable to bring the transducer heads to the landing area in a controlled manner, particularly when the landing area is away from the disk surface e.g. a ramp. In conventional actuator retraction systems the actual velocity of the actuator assembly is either sampled or determined over a limited range. What is needed is a more efficient system that extracts reliable full range velocity information from the VCM.

SUMMARY

As described in detail below, a circuit for satisfying this need includes a sense amplifier for sensing and amplifying VCM current, a current integrator for determining the actual velocity of the actuator assembly during every seek command, an H-bridge driver, which controls the direction of current to the VCM and magnitude of voltage across the VCM, and a window compare and logic block that receives and sorts information from the integrator, the disk drive microprocessor and an analog timer. The window compare and logic block determines the direction of current and magnitude of voltage to apply to the VCM. During a loss of power, e.g. a power down or sudden loss of power, the actuator assembly is controlled through a sequence of movements, depending on the position and actual velocity of the actuator assembly/transducer head at the moment power was lost, to ensure that the transducer head is retracted to the ramp under constant velocity. Specifically, if the actuator assembly is on-track, the actuator assembly is moved to an inner diameter (ID) track of the disk at a first constant velocity, then to the ramp at a second constant velocity. If the actuator assembly is seeking in the direction of the ID track, then the actuator velocity is retarded to the first constant velocity, moved to the ID track, then moved to the ramp at the second constant velocity. If the actuator assembly is moving in the direction of an outer diameter (OD) track and its velocity is greater than the second constant velocity, then the actuator velocity is retarded to the second constant velocity, then moved to the ramp at the second constant velocity.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
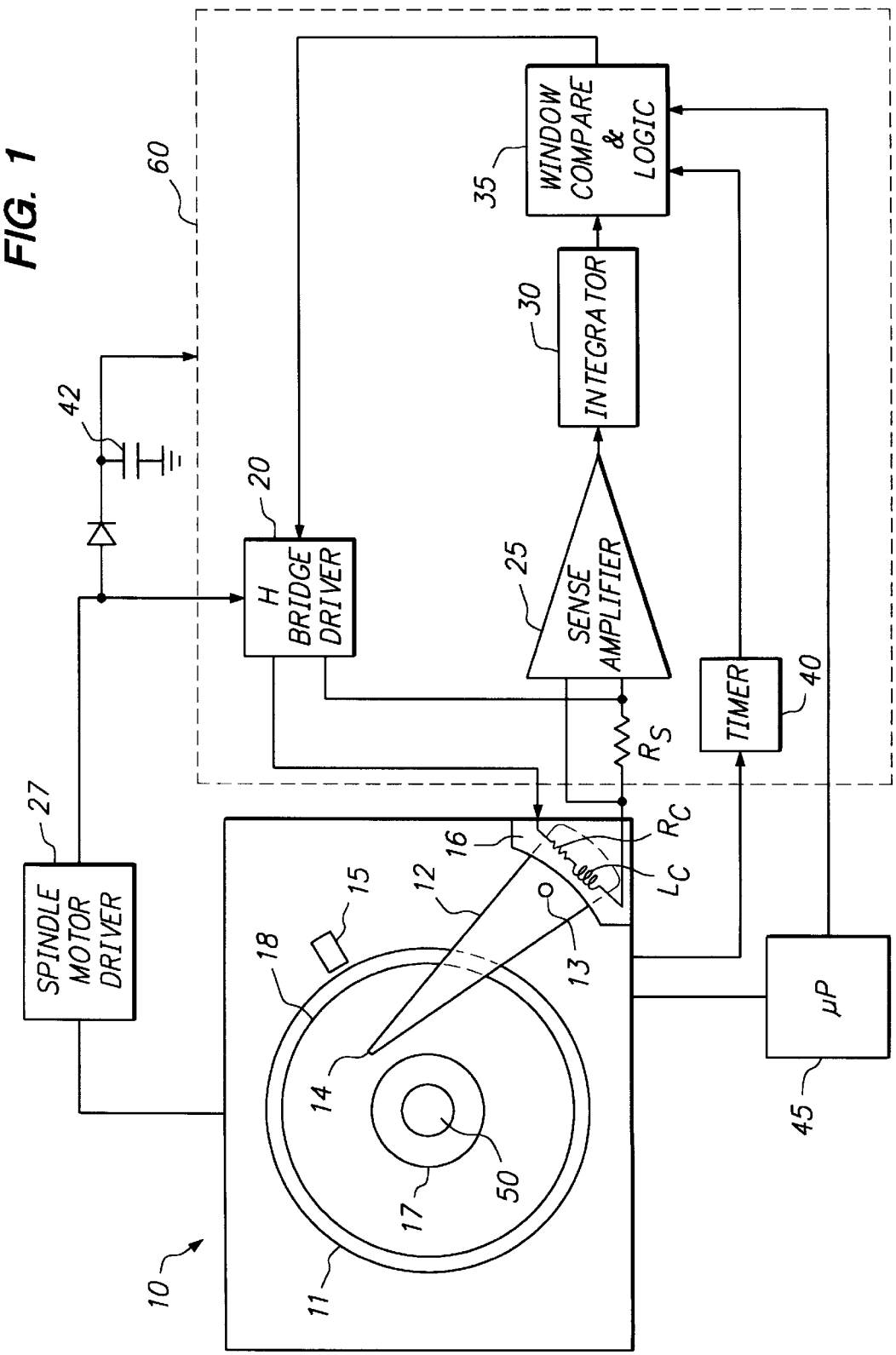
FIG. 1 is a block diagram of relevant portions of a disk drive including an actuator assembly, a ramp and a circuit for controlling a retracting velocity of the actuator assembly in accordance with principles of the present invention.
Figure 3:
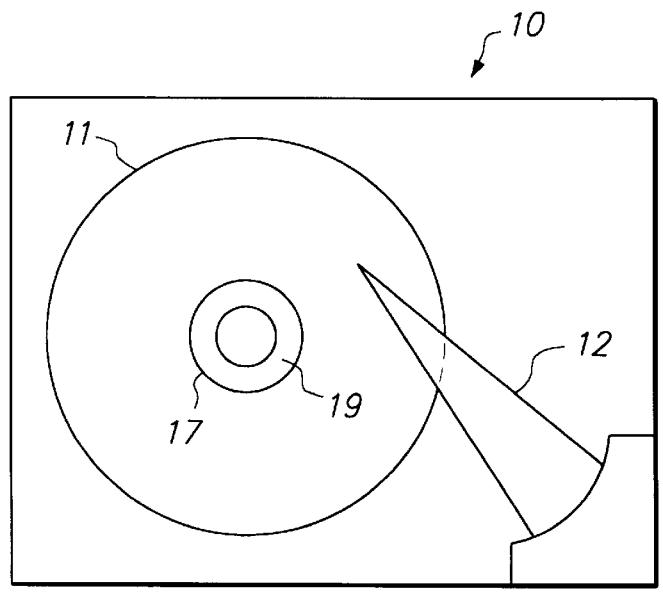
FIG. 3 is a top view of an alternative embodiment of the disk drive of FIG. 1, having an annular landing area adjacent the inner diameter track instead of a ramp.

Referring initially to FIG. 1, a disk drive 10 according to the present invention includes one or more rotating data storage disks, one disk 1 is shown in FIG. 1 for convenience. The disks are mounted to a spindle, which is rotated at a constant predetermined angular velocity by a spindle motor 50. A rotary voice coil actuator motor (VCM) 16 positions an actuator assembly 12 relative to the rotating data storage disk. The actuator assembly 12 positions a read/write data transducer head 14 at desired track locations, such as outer diameter (OD) track 18 and inner diameter (ID) track 17, defined on an associated storage surface of each disk 11 in order to carry out reading and writing of user data in conventional fashion. Details of the circuitry employed for reading and writing are well understood and are not pertinent to the present invention. Also included in disk drive 10, is a mechanical ramp 15 positioned adjacent the outer edge of the disk 11. The ramp 15 functions as a load/unload landing area for actuator assembly 12, when the disk drive 10 is powered down, so that the transducer head 14 avoids contact with the data storage surface of disk 11. Alternatively, disk drive 10 may include a conventional landing zone 19, as shown in FIG. 3, defined axially adjacent the ID track 17, rather than a ramp. The landing zone 19 typically does not contain any data and is dedicated for parking the transducer head 14 when the disk drive 10 is powered down. In either embodiment, the actuator assembly is positioned to the landing area, i.e. ramp 15 or landing zone 19, when the disk drive 10 is powered down.

The spindle motor 50 is a DC brushless motor having a rotor comprising a permanent magnet ring, and a fixed laminated stator structure which includes stator windings arranged/connected into three electrical phases, each phase being shifted from the others by 120 electrical degrees. The three phases are connected together at a center tap. The motor phase and center tap are connected to a spindle motor driver 27, which includes conventional connected three-phase source and sink transistor drivers. When power to spindle motor 50 is removed, as during a power-down sequence or a sudden loss of external power, the spindle motor 50 becomes a generator and rotational energy of the disks 11a and 11b is converted into electrical currents in the motor windings. It is well known that the converted energy, known as back EMF (BEMF) may then be used to retract the actuator assembly 12 to a landing area i.e. ramp 15 or landing zone 19.

In accordance with principles of the present invention, a circuit 60 for controlling a retracting velocity of the actuator assembly 12 and transducer head 14 as they are retracted to the ramp 15 during a loss of power to the disk drive, includes an H-bridge VCM driver circuit 20, a current integrator 30, a sense amplifier 25, a window compare and logic block 35, and an analog timer 40.

H-bridge driver circuit 20 includes two pairs of current source and current sink field effect transistors (FET) drivers, with a voice coil resistor $R_c$ and a sense resistor $R_s$ interconnecting the two pairs. One pair of drivers sources and sinks current for VCM 16 motion in an inward radial direction relative the disk i.e. towards the ID track 17, while the pair of drives sources and sinks current in an outward radial direction relative the disk, i.e. towards the OD track 18. In this manner, the VCM 16 positions the actuator assembly 12 back and forth between the ID track 17 and OD track 18 and onto the landing area, either landing zone 19 or ramp 15.

A sense amplifier senses and amplifies the current across VCM 16. Current integrator 30 determines an actual velocity of the actuator assembly 12 during every seek command. Integrator 30 integrates the current across the VCM 16 and the output is the actual velocity of the actuator assembly 12. At power up, the actual velocity is scaled accordingly to individual drives, i.e. to compensate for any flex bias, and communicated to the window compare and logic block 35. Therefore, the actual velocity is known at all time, should the disk drive 10 lose power.

Window compare and logic block 35 receives the actual velocity of the actuator assembly 12 information from integrator 30, compares the actual velocity against a predetermined threshold velocity that may be fixed or set by the disk drive microprocessor 45, receives timing information from timer 40 and receives position information on the transducer head, relative to the various data tracks on the disk, from the microprocessor 45. Window compare and logic block 35 also sorts the information from the integrator 30, timer 40 and microprocessor 45 and determines the magnitude and direction of a current that is applied across the VCM 16 to control the direction and velocity of the actuator assembly 12. The velocity control information is provided to H-bridge driver 20, which as explained above, controls the current applied across the VCM 16.

Analog timer 40 is activated when the drive 10 is powered off. The timer 40 sets a predetermined duration of time that a voltage is applied across VCM 16 to enable the actuator assembly 12 to successfully reach the ID track 17 and then the ramp 15 during the retracting sequence, as described herein below.

Microprocessor 45 provides constant monitoring of the transducer head position as well as the predetermined threshold velocity value to window compare and logic block 35. Therefore, that information is readily available to circuit 60 when power to the drive is lost for whatever reason. After the disk drive 10 loses power, the microprocessor essentially is inactive with the exception of setting a master enable function of the drive. At power up, the microprocessor 45 determines whether to activate circuit 60 depending on whether the actuator assembly 12 is parked on the ramp 15, in the process of moving up or down the ramp 15, or positioned over the disk.

Figure 2:
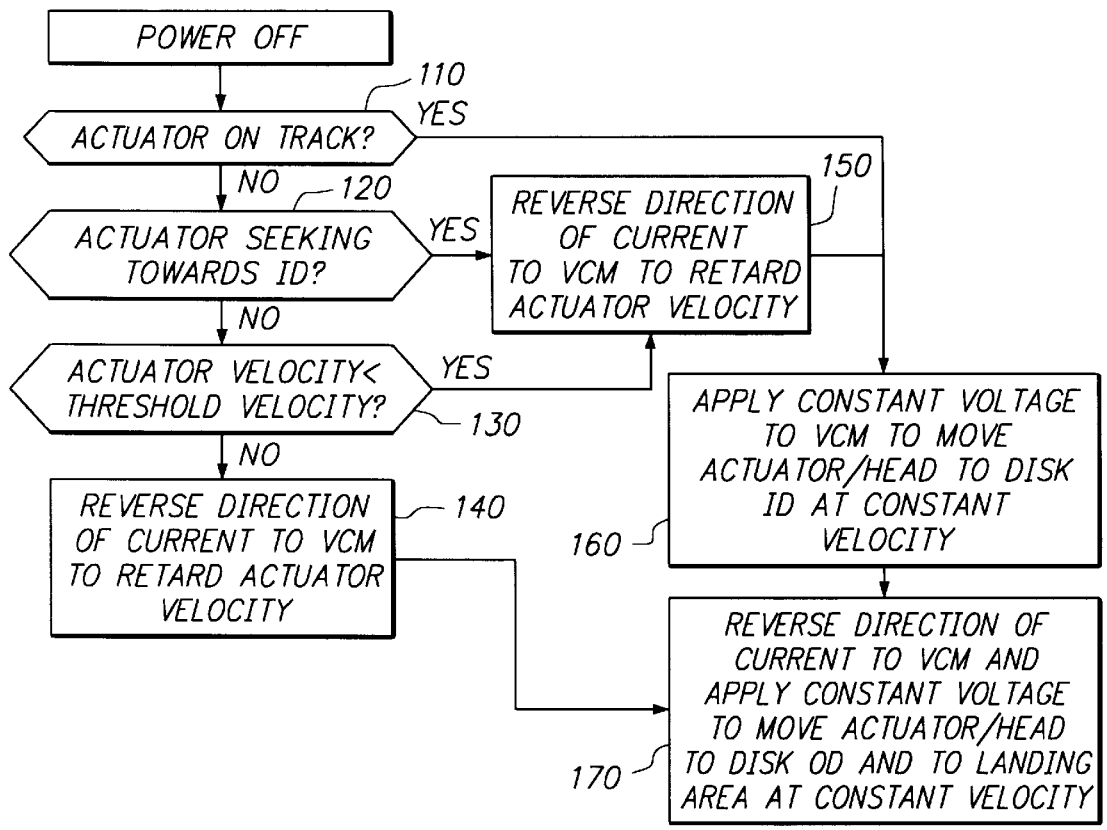
FIG. 2 is a flow chart representation of a method of controlling the retracting velocity of the actuator assembly in accordance with principles of the present invention.

FIG. 2 provides a step-by-step flow diagram of the power-off velocity control of the actuator assembly, in accordance with principles of the present invention. When the disk drive 10 loses power, the disk drive 10 Power-On Reset (POR) triggers the activation of circuit 60, assuming that the transducer head 14 is not already parked on the ramp 15. With the aforementioned information from the microprocessor 45, the window compare and logic block 35 first determines whether the transducer head 14 is "on-track", i.e. not in a seek mode at step 110. If the transducer head 14 is on-track, then H-bridge driver applies a constant voltage across the VCM 16, for a predetermined time as set by timer 40, to enable the actuator assembly/transducer 14 head to move sufficiently to the ID track 17 at a first constant velocity (ID velocity), in step 160. Preferably, the predetermined time is set to the most conservative case where the transducer head 14 is positioned at the OD track 18. At step 170 the H-bridge driver reverses the direction of the VCM current and applies a constant voltage across the VCM 16, for the predetermined time as set by timer 40, to enable the transducer head 14 to move from the ID track 17 towards the OD track 18 and onto the ramp 15 at a second constant velocity (OD velocity). A preferred OD velocity for moving the transducer head onto a ramp 15 is approximately 10–30 inches per second (ips). Depending on the application, the ID velocity and the OD velocity may or may not be the same.

If, at step 110, it is determined that the actuator is not on-track, then the integrator 30 provides information as to whether the actuator assembly 12 is seeking towards the ID track 17, i.e. moving in the direction toward the ID track 17, at step 120. If the actuator assembly 12 is seeking towards the ID track 17, then the window compare and logic block 35 instructs the H-bridge driver 20 to retard the velocity of the actuator assembly 12. This is accomplished by reversing the direction of current to the VCM 16, at step 150, until the velocity of the actuator assembly is retarded to the ID velocity. At step 160, the H-bridge driver 20 applies a constant voltage across the VCM 16 so that the transducer head 14 moves to the ID track 17 at a constant ID velocity. Then step 170 is performed as described herein above.

If, at step 120, it is determined that the actuator assembly 12 is not seeking towards the ID track 17, i.e. moving in the direction of the OD track, then the window compare and logic block 35 determines whether the actual velocity of the actuator assembly 12 is less than the OD velocity value, in step 130. If the outcome in step 130 is in the affirmative, then steps 150, 160 and 170 are performed in sequence, as described above.

If the window compare and logic block determines that the outcome of step 130 is negative, then the actual velocity of the actuator assembly 12 is retarded as H-bridge driver 20 reverses the current across the VCM 16, in step 140. Then the transducer head 14 is retracted at the constant OD velocity toward the OD track 18 and then to the ramp 15, in step 170.

When power to the disk drive 10 is lost or turned off, BEMF from the spindle motor 50 supplies the power to H-bridge driver 20 for retarding and retracting the actuator assembly 12. A reservoir capacitor 42 (shown in FIG. 1) may be added to supply additional voltage if the BEMF DC level is insufficient to power the circuit 60. In addition, a second capacitor may be coupled to the spindle motor driver 27 to provide additional current to retract the actuator assembly 12.

While circuit 60 has been described with reference to retracting the actuator assembly 12 onto a ramp 15, circuit 60 may also retract actuator assembly 12 to an annular parking area 19 of disk 11, as shown in FIG. 3.

While the particular disk drive 10 as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. In a disk drive including at least one rotating storage disk, each disk having a plurality of concentric data tracks, an actuator assembly including at least one transducer head, each being supported by a suspension arm, a method for retracting the actuator assembly to a landing area during a loss of power comprising the step of:

determining whether the transducer head is positioned over a data track; and retracting the transducer head such that the transducer head moves towards the landing area at a substantially constant OD velocity.

2. The method of claim 1 wherein the step of retracting the transducer head further comprises the step of:

moving the transducer head to an inner diameter track when the transducer head is positioned over a data track;

moving the transducer head from the inner diameter track to the landing area at the substantially constant OD velocity.

3. The method of claim 1 wherein the step of retracting the transducer head further comprises the steps of:

determining whether the transducer head is seeking towards the inner diameter track when the transducer head is not positioned over a data track;

determining an actual velocity of the transducer head;

comparing the actual velocity to the OD velocity.

4. The method of claim 3 wherein when either the transducer head is seeking towards the inner diameter track or the actual velocity of the transducer head is less than the threshold velocity, the step of retracting the transducer head further comprising the steps of:

retarding the actual velocity of the transducer head to an ID velocity;

moving the transducer head to the inner diameter track at the substantially constant ID velocity; and moving the transducer head from the inner diameter track to the landing area at the substantially constant OD velocity.

5. The method of claim 3 wherein when the transducer head is seeking towards the outer diameter track and the ac velocity of the transducer head is greater than the threshold velocity, the step of retracting the transducer head further comprises the steps of:

retarding the actual velocity of the transducer head to the OD velocity; and moving the transducer head to the landing area at the substantially constant OD velocity.

6. The method of claim 1 wherein the landing area comprises a ramp positioned adjacent the disk.

7. The method of claim 1 wherein the landing area comprises a non-data annular area of the disk.

8. The method of claim 3 wherein the step of determining the actual velocity comprises integrating a current to an actuator assembly voice coil motor.

9. The method of claim 1 wherein the step of retracting the transducer head comprises utilizing back EMF from a disk spindle motor.

10. The method of claim herein the step of retarding the transducer head comprises utilizing back EMF from the disk spindle motor.

11. The method of claim 10 wherein the step of retarding the actual velocity of the transducer head further comprises reversing the direction of current to the actuator assembly voice coil motor.

12. In a disk drive including at least one rotating storage disk rotated by a spindle motor, each disk having a plurality of concentric data tracks, an actuator assembly including at least one transducer head and driven by a voice coil motor, a circuit for controlling a velocity of the transducer head to a landing area during a loss of power, the circuit comprising:

an H bridge driver coupled to the voice coil motor for controlling a direction of current and a voltage to the voice coil motor;

an integrator coupled to the voice coil motor for determining an actual velocity of the actuator assembly; and a window compare and logic block coupled to a disk drive microprocessor, a timer, the H bridge driver and the integrator, the window compare and logic block receives the actual velocity information from the integrator, transducer head position information from the microprocessor, and communicates voice coil motor control information to the H bridge driver.

13. The circuit of claim 12 further comprising a sense amplifier for sensing current from the voice coil motor, the sense amplifier being coupled to the integrator.

14. The circuit of claim 12 wherein the window compare and logic block further compares the actual velocity of the trandsucer head to one or more threshold velocities.

15. The circuit of claim 14 wherein the integrator and the window compare and logic block determine whether the transducer head is positioned on a data track or seeking towards a data track.

16. The circuit of claim 15 wherein the H bridge driver applies a substantially constant voltage to the voice coil motor to move the transducer head at a substantially constant ID velocity to an inner diameter track when the transducer head is positioned on the data track.

17. The circuit of claim 16 wherein the H-bridge driver reverses the current to the voice coil motor and applies a substantially constant voltage to move the transducer head from the inner diameter track to the landing area at a substantially constant OD velocity.

18. The circuit of claim 15 wherein the H bridge driver reverses the current to the voice coil motor to retard the actual velocity of the transducer head when the transducer head is seeking towards a data track.

19. The circuit of claim 18 wherein the H bridge driver further applies the substantially constant voltage across the voice coil motor to move the transducer head at the substantially constant ID velocity, to the inner diameter track.

20. The circuit of claim 19 wherein the H bridge driver further reverses the direction of the current to the voice coil motor to move the transducer head at the substantially constant OD velocity, to the landing area.

21. The circuit of claim 18 wherein the H bridge driver reverses the direction of the current to the voice coil motor to move the transducer head to the landing area at the substantially constant OD velocity when the transducer head is seeking towards an outer diameter track and the actual velocity is greater than the OD velocity.

22. The circuit of claim 17 wherein the landing area comprises a ramp positioned adjacent the disk.

23. The circuit of claim 17 wherein the landing area comprises an annular non-data area of the disk.

24. The circuit of claim 18 wherein the substantially constant voltage is supplied by back EMF from the spindle motor.

25. The circuit of claim 12 further comprising a capacitor coupled to a spindle motor driver.

26. The circuit of claim 17 wherein the substantially constant ID velocity and the substantially constant OD velocity are equivalent.

27. A disk drive comprising:
   one or more rotating storage disk, each disk having a plurality of concentric data tracks;
   a spindle motor;
   an actuator assembly including at least one transducer head;
   a voice coil motor for driving the actuator assembly;
   a circuit for controlling a retracting velocity of the transducer head to a landing area during a loss of power, the circuit comprising:
   an H bridge driver coupled to the voice coil motor for controlling a direction of current and a voltage to the voice coil motor;
   an integrator coupled to the voice coil motor for determining an actual velocity of the actuator assembly; and
   a window compare and logic block coupled to a disk drive microprocessor, a timer, the H bridge driver and the integrator, the window compare and logic block receives the actual velocity information from the integrator, transducer head position information from the microprocessor, and communicates voice coil motor control information to the H bridge driver.

* * * * *